United States Patent [19]
Dugan

[11] Patent Number: 5,947,868
[45] Date of Patent: Sep. 7, 1999

[54] SYSTEM AND METHOD FOR IMPROVING FITNESS EQUIPMENT AND EXERCISE

[76] Inventor: Brian M. Dugan, 18 John St., Tarrytown, N.Y. 10591

[21] Appl. No.: 09/104,917

[22] Filed: Jun. 25, 1998

Related U.S. Application Data

[60] Provisional application No. 60/051,074, Jun. 27, 1997.
[51] Int. Cl.$^6$ ....................................................... A61B 5/04
[52] U.S. Cl. ................................. 482/4; 434/247; 434/1; 434/902
[58] Field of Search ............................... 482/1–9, 51–54, 482/900–902; 434/247

[56] References Cited

U.S. PATENT DOCUMENTS

| | | | |
|---|---|---|---|
| 4,542,897 | 9/1985 | Melton et al. | 482/8 |
| 4,735,410 | 4/1988 | Nobuta | 482/9 |
| 4,976,435 | 12/1990 | Shatford et al. | 482/6 |
| 5,362,069 | 11/1994 | Hall-Tipping | 482/8 |
| 5,527,239 | 6/1996 | Abbondanza | 482/8 |
| 5,591,104 | 1/1997 | Andrus et al. | 482/7 |
| 5,672,107 | 9/1997 | Clayman | 482/901 |
| 5,702,323 | 12/1997 | Poulton | 482/8 |

*Primary Examiner*—Glenn E Richman
*Attorney, Agent, or Firm*—Dugan & Dugan

[57] ABSTRACT

A method and apparatus for exercise equipment and exercise is provided. One or more exercise monitors are attached to a piece of exercise equipment and/or an exerciser. During exercise, each exercise monitor measures a performance level of the exerciser and outputs a performance level signal to a video game player. The video game player monitors the performance level signal and controls the performance level of a video game character based on the performance level of the exerciser. Many exerciser performance levels may be monitor such as pulse rate, exercise rate, distance traveled, time exercised, etc. and can be used to control such video game character performance levels as speed, striking force, energy level, lifetime, game level, etc. The video game player preferably comprises a hand-held video game player.

21 Claims, 2 Drawing Sheets

SYSTEM AND METHOD FOR IMPROVING FITNESS EQUIPMENT AND EXERCISE

This application claims priority from United States provisional application Ser. No. 60/051,074, filed Jun. 27, 1997.

FIELD OF THE INVENTION

The present invention relates to exercise equipment and fitness activities, and more particularly to a system and method for improving fitness equipment and exercise.

BACKGROUND OF THE INVENTION

A fitness craze has recently swept the United States and many other countries. From fat-free potato chips to treadmills, people around the world have become obsessed with weight loss and healthy living. Accordingly, record numbers of new fitness products/exercise equipment have emerged to meet this obsession (including stair climbers, treadmills, recumbent bicycles, ski machines, and the like).

Many pieces of exercise equipment, when used regularly, are very useful for weight loss, for improving cardiovascular stamina, and for strengthening various muscles. However, most exercise equipment suffers from a major drawback: the equipment is boring to use because of its inability to successfully encourage a user (e.g., an exerciser) to continue exercising. As a result, most purchasers of exercise equipment stop using the equipment shortly after purchasing it.

A need therefore exists for a system and a method for making both existing and new exercise equipment more enjoyable by successfully stimulating and encouraging an exerciser to continue exercising. Such a system and a method will significantly improve both existing and new exercise equipment, as well as exercise itself (e.g., by making it more enjoyable).

It is therefore an object of the present invention to provide a system and a method for making existing or new exercise equipment more stimulating to an exerciser, thereby improving exercise.

SUMMARY OF THE INVENTION

These and other objects of the invention are accomplished in accordance with the principles of the invention by providing a system and a method for improving both new and existing exercise equipment and exercise.

Exercise equipment and/or exercise is modified by placing an exercise monitor (e.g., a pulse monitor, a distance meter, a rate monitor, a time monitor, a calorie meter, a strain gauge, an accelerometer and/or any other sensor for measuring the physical activity/performance level of an exerciser) on the equipment and/or the exerciser. The exercise monitor outputs a signal representative of the performance level of an exerciser using the exercise equipment (e.g., pulse rate, distance traveled, time exercised, rate of exercise, etc.). The performance level signal then is fed to a video game player wirelessly or via a cable. The video game player may be a desk-top computer, or preferably comprises a hand-held video game player such as a GameBoy™ marketed by Nintendo.

To stimulate the exerciser, the output from the exercise monitor is used by the video game player in an interactive fashion. For example, the output from the exercise monitor may be used to control a parameter within a video game that runs on the video game player, such as a video game character's performance level (e.g., lifetime, energy level, striking force, accuracy, speed or the like). Similarly, a video game character may be precluded from reaching a higher level in a game unless the exerciser pedals fast enough, runs far enough, exercises long enough, has a high (or low) enough pulse rate or reaches some other performance level. Multiple performance levels of an exerciser may be monitored and used to control multiple performance levels of a video game character (e.g., pulse rate of the exerciser dictates energy level or lifetime of a video game character, exercise rate controls the speed of or the striking force of the video character, and length of exercise controls game level).

Other objects, features and advantages of the present invention will become more fully apparent from the following detailed description of the preferred embodiments, the appended claims and the accompanying drawings.

DETAILED DESCRIPTION OF THE PREFERRED EMBODIMENTS

Figure 1:
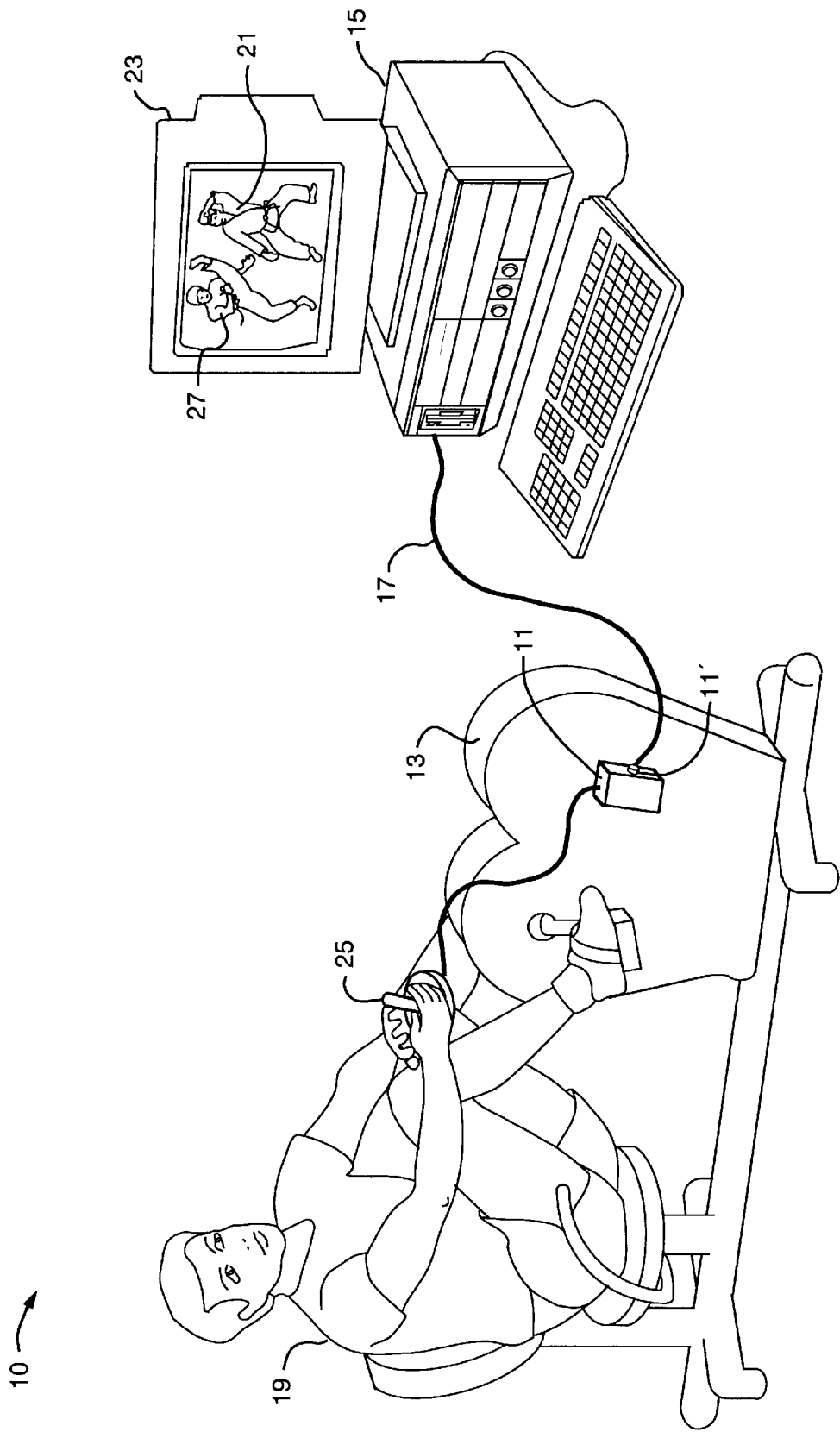
FIG. 1 is a schematic view of an exercise system for exercising in accordance with a first embodiment of the present invention.

FIG. 1 is a schematic view of an exercise system 10 configured in accordance with a first embodiment of the present invention. With reference to FIG. 1, the exercise system 10 comprises an exercise monitor 11 connected to a recumbent bicycle 13, and a computer 15 coupled to an output 11' of the exercise monitor 11 via a cable 17. Any other piece of exercise equipment may be similarly employed (e.g., a stair climber, a stationary bicycle, a rowing machine, etc.).

The exercise monitor 11 is configured to measure the pedal rate of an exerciser 19 riding the recumbent bicycle 13, and to output an approximately real-time measure of pedal rate via the output 11'. Other or additional exerciser performance levels (e.g., a measure of the length, intensity or some other characteristic of the exercise activity) may be monitored and output by monitor 11 or by other monitors. The pedal rate output by the monitor 11 is monitored by the computer 15 while the computer 15 runs a video game such as a martial arts video game (represented in FIG. 1 by a martial arts character 21 on a computer screen 23 coupled to the computer 15).

The exerciser 19 is shown holding a joystick 25 for controlling the kicking, punching and other movements of the martial arts character 21 on the computer screen 23. The joystick 25 may be directed connected to the computer 15 or coupled to the computer 15 via the monitor 11 as shown in FIG. 1. The joystick/computer connection also may be wireless.

In operation, as the exerciser 19 pedals the recumbent bicycle 13, the monitor 11 measures and outputs (via the output 11') a signal representative of the pedal rate of the exerciser 19. The pedal rate signal output by the monitor 11 is monitored by the computer 15 and is used to control the energy level (e.g., the strength and durability) of the martial arts character 21. Accordingly, the harder the exerciser 19 pedals the bicycle 13, the higher the energy level of the martial arts character 21, and the less likely the martial arts character 21 is to perish from an attack by an opponent martial arts character 27. By exercising harder, the exerciser 19 can therefore score higher or otherwise perform better at the video game.

Many different performance levels of the exerciser 19 can be monitored and used to control a video game character's performance levels (e.g., how the character behaves, reacts, etc.). Table 1 contains a representative list of exerciser performance levels that may be monitored as the exerciser 19 exercises on the recumbent bicycle 13 or on some other piece of exercise equipment, and possible video character performance levels that can be controlled for each monitored exerciser performance level. Table 1 is not intended as a limitation on monitorable performance levels and is merely exemplary.

TABLE 1

| MONITORED EXERCISER PERFORMANCE LEVEL | VIDEO GAME CHARACTER PERFORMANCE LEVEL CONTROLLED |
| --- | --- |
| pedaling rate | speed, striking force |
| stepping rate | speed, striking force |
| rowing rate | speed, striking force |
| running rate | speed, striking force |
| pulse rate | speed, energy level, accuracy |
| striking force | striking force |
| swing velocity | swing velocity |
| distance traveled | game level |
| time exercised | game level |

Accordingly, exercise equipment, such as the recumbent bicycle 13, and/or exercise is modified by placing an exercise monitor 11 (e.g., a pulse monitor, a distance meter, a rate monitor, a time monitor, a calorie meter, a strain gauge, an accelerometer and/or any other sensor for measuring the physical activity/performance level of an exerciser) on the equipment and/or the exerciser 19. The exercise monitor 11 outputs a signal representative of the performance level of the exerciser 19 (e.g., pulse rate, distance traveled, time exercised, rate of exercise, etc.) to a video game player (e.g., a computer 15) wirelessly or via a cable. The video game player may be a desk top computer, or preferably comprises a hand-held video game player such as a GameBoy™ (as described with reference to FIG. 2).

To stimulate the exerciser 19, the output from the exercise monitor 11 is used to control a parameter within a video game, such as a video game character 21's lifetime, energy level, striking force, accuracy, speed or the like. Similarly, a video game character 21 may be precluded from reaching a higher level in a game unless the exerciser 19 pedals fast enough, exercises long enough, has a high (or low) enough pulse rate or reaches some other performance level. Multiple performance level measurements of the exerciser 19 may be monitored and used to control multiple performance levels of the video game character 21 (e.g., pulse rate of the exerciser 19 dictates energy level/lifetime of the video game character 21, exercise rate controls the speed of or the striking force of the video game character 21, and duration/distance of exercise controls game level).

Examples of suitable video games include action-adventure games (e.g., military games, dungeon games, murder-mystery games, etc.), martial arts games, sports games (e.g., hiking, swimming, baseball, basketball, tennis, etc.), and other similar games. For instance, during a video baseball game, the force with which a batter strikes a baseball or the speed with which a player runs around a base may be controlled by the speed with which an exerciser pedals, climbs stairs, rows, etc. Similarly, the speed with which a football player rushes or passes, the power with which a boxer punches or a martial artist kicks, or the height to which a basketball player jumps may be similarly controlled. The "energy level" (e.g., a measure of how long a character can survive an event, attack, etc.) or lifetime of a character can be similarly controlled, or controlled by the pulse rate or other cardiovascular indicator of the exerciser. The key is to make the exerciser exercise harder or longer in order to continue the game or do better in the game. Accordingly, the exerciser is stimulated to work harder in exchange for some immediate success or gratification (e.g., doing better in the game). Preferably, game score/performance will increase with an increasing level of physical fitness (e.g., reduced pulse rate for a given exercise routine, harder workouts, etc.).

If desired, the video game player may analyze the data from the exercise monitor and compile statistics on the exerciser's performance. A database can be maintained for each new exerciser and updated after each exercise session so that progress charts and other statistics can be generated for each exerciser. If desired, other relevant data such as a exerciser's weight, body fat, and the like also may be stored and used to assess progress.

Figure 2:
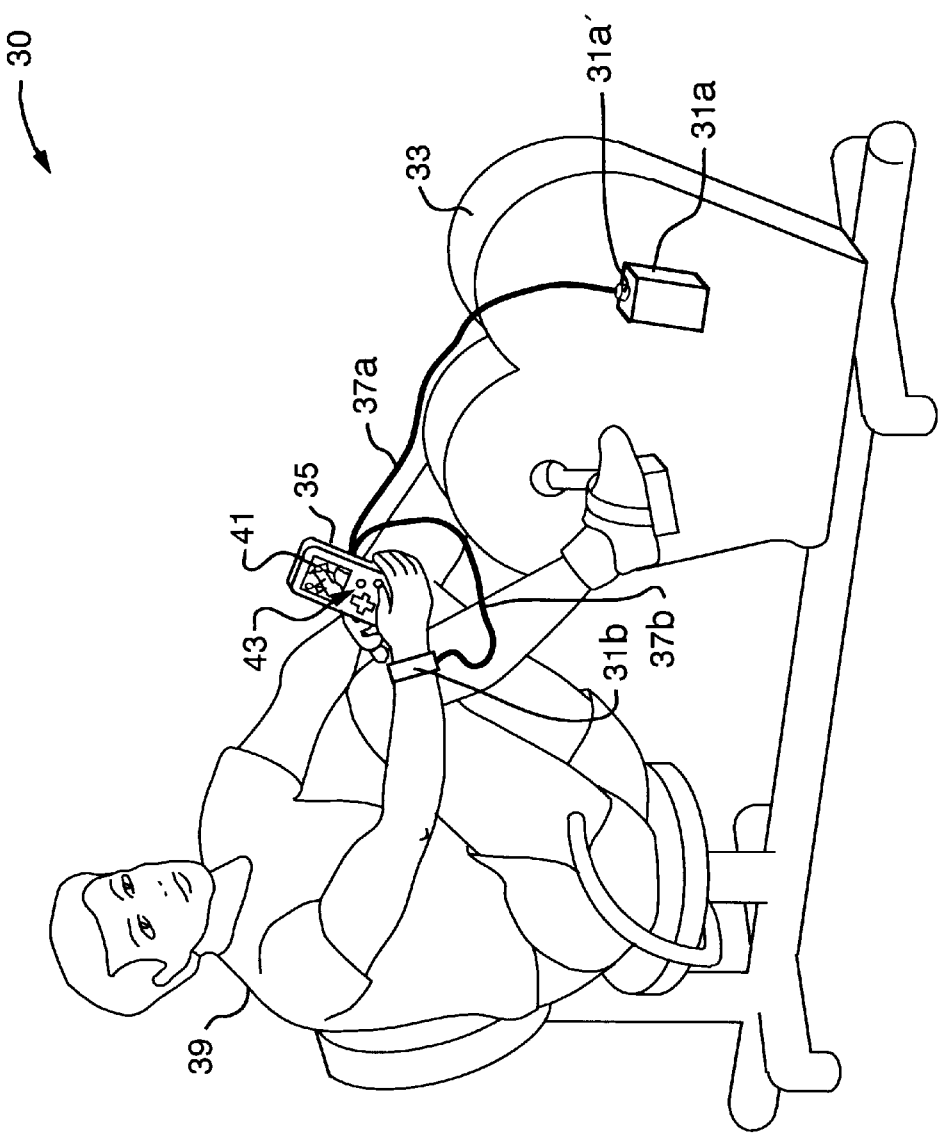
FIG. 2 is a schematic view of an exercise system for exercising in accordance with a second embodiment of the present invention.

FIG. 2 is a schematic view of an exercise system 30 configured in accordance with a second embodiment of the present invention. With reference to FIG. 2, the exercise system 30 comprises an exercise monitor 31a connected to a recumbent bicycle 33, and a hand-held video game player 35 (such as a GameBoy™ marketed by Nintendo) coupled to an output 31a' of the exercise monitor 31a via a first cable 37a.

The exercise monitor 31a is configured to measure the pedal rate of an exerciser 39 riding the recumbent bicycle 33, and to output an approximately real-time measure of pedal rate via the output 31a'. In addition to the exercise monitor 31a, an exercise monitor 31b is shown connected to the exerciser 39 and to the hand-held video game player 35 via a second cable 37b. The exercise monitor 31b is configured to measure the pulse rate of the exerciser 39. The pedal rate output by the monitor 31a and the pulse rate of the exerciser 39 output by the monitor 31b are monitored by the hand-held video game player 35 while the hand-held video game player 35 runs a video game such as a martial arts video game (represented in FIG. 2 by a martial arts character 41). The exerciser 39 is shown holding the hand-held video game player 35 and can control the kicking, punching and other movements of the martial arts character 41 via buttons 43 on the front of the hand-held video game player 35.

In operation, as the exerciser 39 pedals the recumbent bicycle 33, the monitor 31a measures and outputs a signal representative of the pedal rate of the exerciser 39, and the monitor 31b measures and outputs a signal representative of the pulse rate of the exerciser 39. The pedal rate signal output by the monitor 31a is monitored by the hand-held video game player 35 and is used to control the striking force of the martial arts character 41. The pulse rate signal output by the monitor 31b is monitored by the hand-held video game player 35 and is used to control the energy level of the martial arts character 41. Accordingly, the harder the exerciser 39 pedals the bicycle 33, the harder the martial arts character 41 can strike an opponent. However, the higher the pulse rate of the exerciser 39, the lower the energy level of the martial arts character 41, making the martial arts character 41 more susceptible to attack. By using the monitored performance levels of the exerciser 39 in this manner, to obtain higher and higher game scores, the exerciser 39 must become more and more cardiovascularly fit so that the exerciser 39 can pedal faster while maintaining a lower pulse rate. Cardiovascular fitness becomes a desirable goal of the exerciser 39 because such fitness yields immediate gratification (e.g., a higher game score).

The foregoing description discloses only the preferred embodiments of the invention, modifications of the above disclosed apparatus and method which fall within the scope of the invention will be readily apparent to those of ordinary skill in the art. For instance, any number of performance levels of an exerciser may be monitored and used to control any number of performance levels of a video game character, and the various monitors described herein may communicate with the video game player wirelessly. As well, conditions within a video game may be output by the video game player and used to increase/decrease the difficulty of exercise, or otherwise affect exercise, if so desired. Further, old video games may be modified for use with the present invention, or new video games may be developed.

Additionally, while the present invention has been described with reference to a single exerciser, it will be understood that the invention is equally applicable to multiple exerciser situations. For instance, different video game characters within the same video game may be controlled by different exercisers. That is, the performance level(s) of a first exerciser may control the performance level(s) of a first video game character, while the performance level(s) of a second exerciser may control the performance level(s) of a second video game character contained within the same video game as the first video game character. In this manner, the exerciser who exercises harder will have a gaming advantage over the other exerciser. Such multi-exerciser applications may be performed locally (e.g., all exercisers in the same room) or remotely (e.g., at least one exerciser in a different location who communicates remotely, such as over the INTERNET or the WORLD WIDE WEB).

Accordingly, while the present invention has been disclosed in connection with the preferred embodiments thereof, it should be understood that other embodiments may fall within the spirit and scope of the invention, as defined by the following claims.

The invention claimed is:

1. A method of exercise comprising:
   providing a monitor for determining a level of exercise performance performed by an exerciser and for outputting a signal representative of the performance level;
   using the monitor to measure a level of exercise performance performed by an exerciser;
   outputting from the monitor a signal representative of the performance level;
   providing a video game on a hand-held video game system, the video game having a character, the video game inputting and being responsive to the performance level signal output by the monitor, the video game using the performance level signal to control a performance level of the video game character; and
   controlling a performance level of the video game character based on the performance level signal output by the monitor.

2. The method of claim 1 wherein providing a monitor comprises providing a pulse monitor.

3. The method of claim 1 wherein providing a monitor comprises providing a monitor selected from the group consisting of a distance monitor, a rate monitor and a time monitor.

4. The method of claim 1 wherein providing a monitor comprises providing an accelerometer.

5. The method of claim 1 wherein providing a video game comprises providing a computer system loaded with a video game.

6. The method of claim 1 wherein outputting from the monitor comprises outputting from the monitor via a cable a signal representative of the performance level.

7. The method of claim 1 wherein outputting from the monitor comprises outputting from the monitor via wireless transmission a signal representative of the performance level.

8. The method of claim 1 wherein controlling a performance level of the video game character based on the performance level signal output by the monitor comprises controlling the energy level of the video game character based on the performance level signal output by the monitor.

9. The method of claim 1 wherein controlling a performance level of the video game character based on the performance level signal output by the monitor comprises controlling the lifetime of the video game character.

10. The method of claim 1 wherein controlling a performance level of the video game character based on the performance level signal output by the monitor comprises controlling the striking force of the video game character.

11. The method of claim 1 wherein controlling a performance level of the video game character based on the performance level signal output by the monitor comprises controlling the accuracy of the video game character.

12. The method of claim 1 wherein controlling a performance level of the video game character based on the performance level signal output by the monitor comprises controlling the game level of the video game character.

13. The method of claim 1 further comprising:
    providing an additional monitor for monitoring the performance level of an additional exerciser;
    outputting from the additional monitor a signal representative of the performance level of the additional exerciser; and
    controlling the performance level of an additional video game character within the video game based on the performance level signal output from the additional monitor.

14. An apparatus for use during exercising comprising:
    a monitor for determining a level of exercise performance performed by an exerciser and for outputting a signal representative of the performance level;
    a hand-held video game player coupled to the monitor; and
    a video game for use with the hand-held video game player, the video game having a character, the video game configured to input the performance level signal output from the monitor and to use the performance level signal to control a performance level of the video game character.

15. The apparatus of claim 14 wherein the monitor comprises a pulse monitor.

16. The apparatus of claim 14 wherein the monitor comprises a monitor selected from the group consisting of a distance monitor, a rate monitor and a time monitor.

17. The apparatus of claim 14 wherein the monitor comprises an accelerometer.

18. The apparatus of claim 14 wherein the video game player comprises a computer system.

19. The apparatus of claim 14 further comprising a wireless transmitter for transmitting the performance level signal from the monitor to the video game player.

20. The apparatus of claim 14 wherein the video game comprises an action-adventure game.

21. The apparatus of claim 14 wherein the video game comprises a sports game.

* * * * *